US012790281B2

(12) United States Patent
Nagayama et al.

(10) Patent No.: US 12,790,281 B2
(45) Date of Patent: Nov. 10, 2026

(54) COLORED SINTERED BODY AND METHOD FOR PRODUCING THE SAME

(71) Applicant: TOSOH CORPORATION, Yamaguchi (JP)

(72) Inventors: Hitoshi Nagayama, Yamaguchi (JP); Hajime Funakoshi, Yamaguchi (JP); Satoshi Tsuchiya, Yamaguchi (JP)

(73) Assignee: TOSOH CORPORATION, Yamaguchi (JP)

(*) Notice: Subject to any disclaimer, the term of this patent is extended or adjusted under 35 U.S.C. 154(b) by 627 days.

(21) Appl. No.: 18/202,393

(22) Filed: May 26, 2023

(65) Prior Publication Data

US 2023/0391674 A1 Dec. 7, 2023

(30) Foreign Application Priority Data

Jun. 3, 2022 (JP) ................................. 2022-091154

(51) Int. Cl.
*C04B 35/488* (2006.01)
*C04B 35/64* (2006.01)

(52) U.S. Cl.
CPC .......... *C04B 35/4885* (2013.01); *C04B 35/64* (2013.01); *C04B 2235/3217* (2013.01); *C04B 2235/3224* (2013.01); *C04B 2235/3225* (2013.01); *C04B 2235/3246* (2013.01); *C04B 2235/3279* (2013.01); *C04B 2235/5204* (2013.01); *C04B 2235/656* (2013.01); *C04B 2235/763* (2013.01); *C04B 2235/77* (2013.01); *C04B 2235/786* (2013.01); *C04B 2235/9661* (2013.01)

(58) Field of Classification Search
CPC ........ C04B 35/4885; C04B 2235/3217; C04B 2235/3246; C04B 2235/3279
See application file for complete search history.

(56) References Cited

U.S. PATENT DOCUMENTS

2016/0347666 A1* 12/2016 Nagayama .............. B32B 18/00
2018/0222799 A1* 8/2018 Yamauchi ............. C04B 35/109

FOREIGN PATENT DOCUMENTS

JP 62-59571 3/1987
JP 1-157462 6/1989
JP 2011-20874 A 2/2011
JP 2017-165599 A 9/2017
WO WO-2016026580 A1 * 2/2016 ............. A61K 6/818

* cited by examiner

*Primary Examiner* — Cameron K Miller
(74) *Attorney, Agent, or Firm* — GREENBLUM & BERNSTEIN, P.L.C.

(57) ABSTRACT

A sintered body comprises zirconia including a stabilizer element dissolved therein and a lanthanoid element dissolved therein, the lanthanoid element having an ionic radius larger than the atomic radius of zirconium. The content of monoclinic zirconia after a hydrothermal treatment at 140° C. for 24 hours is less than 25%. The sintered body includes a spinel compound including aluminum and a coloring element.

16 Claims, No Drawings

COLORED SINTERED BODY AND METHOD FOR PRODUCING THE SAME

BACKGROUND OF THE INVENTION

1. Field of the Invention

The present disclosure relates to a colored sintered body that includes zirconia as a matrix.

2. Description of the Related Art

It is possible to color a sintered body that includes zirconia as a matrix in an intended color by addition of a lanthanoid rare-earth element or a transition metal element. When a sintered body includes a coloring element, in addition to the inherent quality appearance and mechanical strength of zirconia, the sintered body comes to have high graphical design function due to the coloration. Therefore, colored sintered bodies including zirconia as a matrix have been used in applications where esthetics is required, such as a decorative member and a package member, in addition to the conventional applications, that is, optical, medical and machine applications. With an increase in the applications in which sintered bodies are used, there has been a growing demand for a sintered body that is consistent in terms of esthetics after use over a long period of time.

Sintered bodies having a greenish tone are known as a colored zirconia sintered body (e.g., Japanese Unexamined Patent Application Publication Nos. 62-59571, 01-157462, 2011-20874 and 2017-165599).

SUMMARY OF THE INVENTION

Although the sintered bodies disclosed in Japanese Unexamined Patent Application Publication Nos. 62-59571, 01-157462, 2011-20874 and 2017-165599 all have a greenish tone, the color tones of the above sintered bodies significantly change, that is, "fading" occurs, when they are subjected to an accelerated aging test, such as a hydrothermal treatment. This results in a severe change in esthetics during use.

It is an object of the present disclosure to provide at least one of a sintered body that includes zirconia as a matrix and has a vivid green tone, the sintering body being resistant to fading, and a method for producing the sintered body.

The inventors of the present invention focused on and studied a coloring element dissolved in a zirconia sintered body that appears green and the state in which the coloring element is dissolved in the zirconia sintered body. Consequently, the inventors found that a zirconia sintered body including a specific compound appears in a vivid green tone and that the change in the color tone of such a zirconia sintered body after use over a long period of time can be reduced compared with green sintered bodies in the related art.

Specifically, the present invention is as described in the claims, and a summary of the present disclosure is as follows.

[1] A sintered body comprising zirconia, the zirconia including:

a stabilizer element dissolved therein; and a lanthanoid element dissolved therein, the lanthanoid element having an ionic radius larger than an atomic radius of zirconium, wherein a content of monoclinic zirconia after a hydrothermal treatment at 140° C. for 24 hours is less than 25%, and the sintered body includes a spinel compound, the spinel compound including aluminum and a coloring element.

[2] The sintered body according to [1], wherein the stabilizer element is one or more selected from the group consisting of yttrium, cerium, magnesium and calcium.

[3] The sintered body according to [1] or [2], wherein the stabilizer element is yttrium.

[4] The sintered body according to any one of [1] to [3], wherein a content of the stabilizer element in the zirconia is 2 mol % or more.

[5] The sintered body according to any one of [1] to [3], wherein the lanthanoid element is one or more selected from the group consisting of praseodymium, neodymium, europium, terbium, holmium and erbium.

[6] The sintered body according to any one of [1] to [4], wherein the lanthanoid element is terbium.

[7] The sintered body according to any one of [1] to [6], wherein a content of the lanthanoid element is 0.1 mol % or more.

[8] The sintered body according to any one of [1] to [7], wherein the coloring element is one or more selected from the group consisting of manganese, nickel, cobalt and iron.

[9] The sintered body according to any one of [1] to [8], wherein the coloring element is nickel.

[10] The sintered body according to any one of [1] to [9], the sintered body including aluminum oxide.

[10] The sintered body according to [10], wherein a content of the aluminum oxide is 0.5% by mass or more and 25% by mass or less.

[12] The sintered body according to any one of [1] to [11], the sintered body having a structure including crystal grains of the zirconia as a matrix and crystal grains of the spinel compound.

[13] The sintered body according to any one of [1] to [12], wherein a proportion of tetragonal phase in a crystal structure of the sintered body is 75% or more.

[14] The sintered body according to any one of [1] to [13], wherein an average size of crystal grains of the zirconia is 2 μm or less.

[15] The sintered body according to any one of [1] to [14], wherein a measured density of the sintered body is 5.45 $g/cm^3$ or more.

[16] The sintered body according to any one of [1] to [15], wherein a lightness L* and chromaticity indices a* and b* of the sintered body in a L*a*b* color system satisfy the following conditions:

lightness L*: $50 \le L^* \le 90$ chromaticity index a*: $-20 \le a^* \le 2$ chromaticity index b*: $-20 \le b^* \le 30$

[17] The sintered body according to any one of [1] to [16], wherein a difference ΔE between color tones of the sintered body before and after a hydrothermal treatment at 140° C. for 24 hours is 0 or more and 2.0 or less.

[18] A member comprising the sintered body according to any one of [1] to [17].

[19] A method for producing the sintered body according to any one of [1] to [17], the method comprising:

forming a powder composition into a green body, the powder composition including a source of a stabilizer element-containing zirconia, 0.2% by mass or more and 5% by mass or less of a source of a lanthanoid element having an ionic radius larger than an atomic radius of zirconium, 0.5% by mass or more and 25% by mass or less of a source of aluminum and 0.03% by mass or more and 8% by mass or less of a source of a coloring element; and sintering the green body at 1,380° C. or more and 1,580° C. or less.

A powder composition comprising a source of a stabilizer element-containing zirconia, 0.2% by mass or more and 5% by mass or less of a source of a lanthanoid element having an ionic radius larger than an atomic radius of zirconium, 0.5% by mass or more and 25% by mass or less of a source of aluminum and 0.03% by mass or more and 8% by mass or less of a source of a coloring element.

According to the present disclosure, at least one of a sintered body that includes zirconia as a matrix and has a vivid green tone, the sintered body being resistant to fading due to degradation, and a method for producing the sintered body may be provided.

DESCRIPTION OF THE PREFERRED EMBODIMENTS

A sintered body according to an example embodiment of the present disclosure will be described below. The terms used in this embodiment are defined as follows.

The term “composition” used herein refers to a substance having a certain chemical composition. Examples of such substances include one or more selected from the group consisting of a powder, granules, a green body, a calcined body and a sintered body. The term “zirconia composition” used herein refers to a composition composed substantially of zirconia and specifically to a composition that includes zirconia as a matrix (base material).

The term “powder” used herein refers to a collection of powder particles and is a composition having flowability. The term “zirconia powder” used herein refers to a powder composed substantially of zirconia and specifically to a powder that includes zirconia as a matrix (base material). The term “powder composition” used herein refers to a composition composed of powders having different properties and specifically to a composition including powders having different chemical compositions.

The term “green body” used herein refers to a composition that is formed of powder particles aggregated with one another by a physical force and that has a certain shape and specifically to a composition that is not heat-treated after it has been formed (e.g., molded) into the shape. The term “zirconia green body” used herein refers to a green body composed substantially of zirconia and specifically to a green body that includes zirconia as a matrix (base material).

The term “sintered body” used herein refers to a composition that is formed of crystal grains, that has a certain shape, and that has been heat-treated at a temperature equal to or higher than the sintering temperature. The term “zirconia sintered body” used herein refers to a sintered body composed substantially of zirconia and specifically to a sintered body that includes zirconia as a matrix (base material).

The term “stabilizer element” used herein refers to an element that dissolves in zirconia to stabilize the crystal phase of zirconia.

The content of a stabilizer element (mol %; hereinafter, also referred to as “stabilizer element content”) in a composition is the molar ratio of the content of the stabilizer element in the composition in terms of oxides to the total of the content of zirconium in the composition in terms of $ZrO_2$ and the content of the stabilizer element in terms of oxides.

“BET specific surface area” may be measured by multi-point BET (five points) in which nitrogen is used as an adsorption gas, in accordance with JIS R 1626. Specific examples of the conditions for the measurement of BET specific surface area are as follows:

Adsorption medium: $N_2$

Adsorption temperature: −196° C.

Pretreatment conditions: deaeration treatment at 250° C. for 1 hour or more in an air atmosphere BET specific surface area can be measured using a common apparatus (e.g., TriStar II 3202, produced by Shimadzu Corporation).

The sintered body according to this embodiment is a sintered body comprising zirconia, the zirconia including a stabilizer element dissolved therein and a lanthanoid element dissolved therein, the lanthanoid element having an ionic radius larger than the atomic radius of zirconium. The content of monoclinic zirconia after a hydrothermal treatment at 140° C. for 24 hours is less than 25%. The sintered body includes a spinel compound, the spinel compound including aluminum and a coloring element.

The sintered body according to this embodiment is a sintered body formed of zirconia that includes a stabilizer element and a lanthanoid element having an ionic radius larger than the atomic radius of zirconium, the stabilizer element and the lanthanoid element being dissolved therein (hereinafter, such zirconia is also referred to as “colored stabilized zirconia”), is specifically a sintered body that includes the colored stabilized zirconia as a matrix (i.e., parent phase or primary phase), and is further specifically a colored stabilized zirconia sintered body.

The stabilizer element may be any element capable of stabilizing zirconia or, in particular, stabilizing the crystal phase of zirconia without coloring zirconia. The stabilizer element is preferably one or more selected from the group consisting of yttrium (Y), magnesium (Mg), cerium (Ce) and calcium (Ca), is further preferably one or more selected from the group consisting of yttrium, magnesium and calcium, and is still further preferably yttrium.

The content of the stabilizer element in the colored stabilized zirconia is not limited and may be set such that the crystal phase of zirconia can be stabilized. The content of the stabilizer element is preferably 2 mol % or more, 2.5 mol % or more, or 2.9 mol % or more and is preferably 15 mol % or less, 6 mol % or less, or 5.8 mol % or less. When the content of the stabilizer element falls within the above range, the fracture of the sintered body during production or under hydrothermal conditions may be reduced. The above upper and lower limits for the content of the stabilizer element in the colored stabilized zirconia may be used in any combination.

In the sintered body according to this embodiment, the colored stabilized zirconia includes a lanthanoid element dissolved therein which has an ionic radius larger than the atomic radius of zirconium (hereinafter, also referred to as “dissolved lanthanoid element”) and the stabilizer element dissolved therein. It is considered that, in a sintered body having a mixed-phase microstructure in which zirconia including the stabilizer element dissolved therein, the dissolved lanthanoid element, and other phases are present in a coexistent manner, sintering proceeds while the dissolved lanthanoid element preferentially dissolves in zirconia in the production step (sintering step). It is considered that this reduces the entry of elements other than the dissolved lanthanoid element, such as a coloring component, into zirconia and consequently enables the production of a vivid green tone.

The dissolved lanthanoid element is preferably one or more selected from the group consisting of praseodymium (Pr), neodymium (Nd), europium (Eu), terbium (Tb), holmium (Ho) and erbium (Er), is further preferably one or more selected from the group consisting of praseodymium, neodymium and terbium, and is still further preferably terbium.

The content of the dissolved lanthanoid element in the colored stabilized zirconia is not limited and may be set appropriately in accordance with the intended color tone of the sintered body. The content of the dissolved lanthanoid element is, for example, 0.10 mol % or more, 0.50 mol % or more, 1.00 mol % or more, or 1.30 mol % or more. The content of the dissolved lanthanoid element is, for example, 3.00 mol % or less, 2.50 mol % or less, 2.00 mol % or less, or 1.80 mol % or less. The above upper and lower limits for the content of the dissolved lanthanoid element in the colored stabilized zirconia may be used in any combination.

In this embodiment, the ionic radius of an octa-coordinated ion of the dissolved lanthanoid element is considered as the ionic radius of the dissolved lanthanoid element. Examples of the ionic radius of the dissolved lanthanoid element include 0.96 Å for praseodymium ($Pr^{4+}$), 1.11 Å for neodymium ($Nd^{3+}$), 1.07 Å for europium ($Eu^{3+}$), 0.88 Å for terbium ($Tb^{4+}$), 1.02 Å for holmium ($Ho^{3+}$) and 1.00 Å for erbium ($Er^{3+}$).

In this embodiment, examples of the atomic radius include 0.84 Å for zirconium ($Zr^{4+}$), 1.01 Å for yttrium ($Y^{3+}$), 0.89 Å for magnesium ($Mg^{2+}$), 0.97 Å for cerium ($Ce^{4+}$) and 1.12 Å for calcium ($Ca^{2+}$).

The sintered body according to this embodiment includes a spinel compound including aluminum and a coloring element and preferably further includes aluminum oxide.

The aluminum oxide is included in the sintered body in the form of crystal grains other than the spinel compound or the colored stabilized zirconia. When the sintered body includes aluminum oxide, it is easy to stabilize the color tone, that is, in particular, the degree of whiteness, of the sintered body. The aluminum oxide is preferably alumina ($Al_2O_3$).

The content of the aluminum oxide is preferably set such that the ratio of the mass of the aluminum oxide to the mass of the sintered body is 0.5% by mass or more or 1% by mass or more and is 25% by mass or less or 20% by mass or less. When the content of the aluminum oxide is 25% by mass or less, a high-density sintered body may be readily formed at a relatively low baking temperature. This makes it easier to stabilize the spinel compound and reduces the change in color tone due to a change in the spinel compound. The above upper and lower limits for the content of the aluminum oxide may be used in any combination.

The spinel compound that includes aluminum and a coloring element (hereinafter, also referred to as "colored spinel compound") is included in the sintered body in the form of crystal grains other than the aluminum oxide or the colored stabilized zirconia. Since the sintered body includes crystal grains of the colored stabilized zirconia as a matrix and crystal grains of the colored spinel compound in a coexistent manner, a vivid green tone may be achieved.

The coloring element may be any coloring element capable of forming a spinel compound together with aluminum. The coloring element is preferably an element having an ionic radius smaller than the atomic radius of zirconium and is more preferably an element having an ionic radius smaller than the atomic radius of zirconium and larger than the ionic radius of an aluminum atom. In such a case, a reaction between the coloring element and aluminum is likely to preferentially proceed in the production step (sintering step) of the sintered body according to this embodiment and the spinel compound may be produced with higher efficiency. In addition, the likelihood of the coloring element dissolving in zirconia may be reduced. This reduces coloration due to mixing of the coloring element with a lanthanoid element. Note that the ionic radius of a hexa-coordinated ion of an aluminum atom is considered as the ionic radius of an aluminum atom. The ionic radius of an aluminum atom is, for example, 0.54 Å ($Al^{3+}$).

Specific examples of the coloring element include transition metal elements other than hafnium or zirconium; 3d transition metal elements; and one or more selected from the group consisting of manganese (Mn), iron (Fe), nickel (Ni) and cobalt (Co). Among these, nickel is preferable. Note that the ionic radius of a hexa-coordinated ion of the coloring element is considered as the ionic radius of the coloring element. Examples of the ionic radius of the coloring element include 0.65 Å for manganese ($Mn^{3+}$), 0.69 Å for nickel ($Ni^{2+}$), 0.61 Å for cobalt ($Co^{3+}$) and 0.65 Å for iron ($Fe^{3+}$).

In order to promote the formation of the spinel compound in the sintering step, the content of the coloring element in the sintered body according to this embodiment is preferably 0.03% by mass or more or 0.1% by mass or more and is preferably 8% by mass or less or 5% by mass or less. The above upper and lower limits for the content of the coloring element may be used in any combination.

Since the sintered body according to this embodiment has a structure including crystal grains of the colored stabilized zirconia as a matrix and crystal grains of the colored spinel compound, the sintered body is resistant to fading due to degradation.

The sintered body according to this embodiment may include impurities in an amount with which the impurities do not adversely affect the color tone of the sintered body. Examples of the impurities include hafnia ($HfO_2$), which is an inevitable impurity included in zirconia. The content of hafnia in the sintered body varies by, for example, the area in which raw materials of zirconia are produced. Note that, in this embodiment, when density or the like is calculated on the basis of chemical composition, hafnia may be regarded as zirconia.

The measured density of the sintered body according to this embodiment is, for example, 5.45 g/cm$^3$ or more or 5.50 g/cm$^3$ or more. This corresponds to a relative density of 95% or more. This reduces the size of pores present in the surface of the sintered body. Consequently, even in the case where the sintered body has pores formed in the surface, negative impacts on visual color tone may be reduced. The measured density of the sintered body according to this embodiment is, for example, 6.10 g/cm$^3$ or less or 6.08 g/cm$^3$ or less. Although the sintered body according to this embodiment has a high theoretical density, the relative density is, for example, 95% or more or 97% or more and is 100% or less or 99.9% or less. The above upper and lower limits for the measured density may be used in any combination. The above upper and lower limits for the relative density may be used in any combination.

Measured density is the ratio [g/cm$^3$] of the mass [g] of the sintered body obtained by mass measurement to the volume measured by a method conforming to JIS R 1634.

In this embodiment, relative density can be calculated as the ratio (%) of measured density to theoretical density.

In the colored zirconia sintered body according to this embodiment, the proportion of monoclinic zirconia measured subsequent to a hydrothermal treatment performed at 140° C. for 24 hours is less than 25%. If the proportion of monoclinic zirconia measured subsequent to a hydrothermal treatment performed at 140° C. for 24 hours is 25% or more, the change in esthetics with time is likely to increase. The proportion of monoclinic zirconia measured subsequent to a hydrothermal treatment performed at 140° C. for 24 hours is preferably minimized and is, for example, 0% or more, more than 0%, 3% or more, or 5% or more.

In this embodiment, the proportion of monoclinic zirconia is the proportion of monoclinic zirconia in the crystal phase of zirconia (hereinafter, this proportion is also referred to as "monoclinic phase ratio").

The monoclinic phase ratio can be determined using the following formula on the basis of a pattern of X-ray diffraction (hereinafter, also referred to as "XRD") on the surface of the sintered body which has been mirror-polished.

$$\text{Monoclinic phase ratio (\%)}=[I_m(111)+I_m(11\text{-}1)]\times100/[I_m(111)+I_m(11\text{-}1)+I_t(111)+I(111)_c]$$

where I's represent the integrated intensities of the respective reflections and the subscripts m, t and c represent monoclinic, tetragonal and cubic phases, respectively.

Examples of conditions under which XRD patterns are measured include the following conditions.

Radiation source: CuKα radiation (λ=0.15418 nm)

Measurement mode: continuous scanning

Scanning speed: 4°/min

Step width: 0.02°

Measurement range: 2θ=26° to 33°

In the above measurement of XRD patterns, preferably, the XRD peaks that correspond to the respective crystal planes of zirconia are measured as peaks having peak tops at the following 2θ values.

XRD peak corresponding to the (111)-plane of monoclinic zirconia: 2θ=31°±0.5°

XRD peak corresponding to the (11-1)-plane of monoclinic zirconia: 2θ=28°±0.5°

The XRD peaks corresponding to the (111)-planes of tetragonal zirconia and cubic zirconia are measured at the same position, and the 2θ values of the peak tops are 2θ=30°±0.5°.

The integrated intensities of the XRD peaks corresponding to the above crystal planes can be measured using SmartLab Studio II (Rigaku Corporation).

The crystal structure of the sintered body according to this embodiment preferably includes a tetragonal phase. When the crystal structure includes a tetragonal phase, the sintered body is likely to reflect the incident light and the transparency of the sintered body may be reduced accordingly. It is more preferable that the primary phase of the crystal structure of the sintered body according to this embodiment be a tetragonal phase. The crystal structure of the sintered body according to this embodiment may be a mixed phase composed of tetragonal and cubic phases. When the primary phase of the crystal structure of the sintered body is a tetragonal phase, the strength of the sintered body according to this embodiment may be further increased.

The proportion of the tetragonal phase in the crystal structure of the sintered body is preferably 75% or more and is further preferably 90% or more. The proportion of the tetragonal phase may be 100% or less or less than 100%. The above upper and lower limits for the proportion of the tetragonal phase may be used in any combination.

In this embodiment, the tetragonal phase ratio may be measured using the following formula on the basis of an XRD pattern obtained as in the measurement of the monoclinic phase ratio.

$$\text{Tetragonal phase ratio (\%)}=I_t(111)\times100/[I_m(111)+I_m(11\text{-}1)+I_t(111)+I(111)_c]$$

The average size of crystal grains of zirconia included in the sintered body according to this embodiment is preferably 2 μm or less or 1 μm or less and is preferably 0.05 μm or more or 0.1 μm or more. When the average size of crystal grains of the zirconia is 2 μm or less, the sintered body is likely to have a high strength. The above upper and lower limits for the average size of crystal grains of the zirconia may be used in any combination.

In this embodiment, the average size of crystal grains of zirconia can be determined by extracting 200 or more (250±10) zirconia crystal grains viewed in an image taken by observing the sintered body according to this embodiment with a scanning microscope (hereinafter, also referred to as "SEM"), calculating the diameters of the crystal grains by an intercept method, and taking the average thereof.

The sintered body according to this embodiment is a sintered body that includes aluminum oxide and the colored spinel compound in addition to the colored stabilized zirconia and is a sintered body composed of crystal grains of the colored stabilized zirconia, crystal grains of aluminum oxide and crystal grains of the colored spinel compound. Since the sintered body includes aluminum oxide and the colored spinel compound in the form of crystal grains isolated from the colored stabilized zirconia, the sintered body may have a vivid green tone and resistance to fading due to degradation.

The sintered body according to this embodiment is a zirconia sintered body having a vivid green tone. An example of the vivid green tone is a color tone represented by a lightness L* of 50 or more and 90 or less, a chromaticity index a* of −20≤a*≤2 and a chromaticity index b* of −20≤b*≤30 in the L*a*b* color system.

In this embodiment, color tone can be measured using a method conforming to JIS Z 8722. Color tone can be measured using a common spectrophotometer (e.g., "CM-700d" produced by Konica Minolta, Inc.) under the following conditions.

Light source: D65 light source

View angle: 10°

Measurement mode: SCI

Background: Black

The difference ΔE between the color tones of the sintered body according to this embodiment before and after a hydrothermal treatment at 140° C. for 24 hours is preferably 2.0 or less, is more preferably 1.5 or less, and is further preferably 1.0 or less. In such a case, even in the case where the sintered body is subjected to a severe environment, the visually identified change in color tone may be reduced to a considerably low level, and it is difficult to visually identify the color tone change. The color tone difference ΔE can be determined using the following formula. The color tone difference ΔE is preferably minimized and is, for example, 0 or more or 0.1 or more. The above upper and lower limits for the color tone difference ΔE may be used in any combination.

$$\Delta E=\{(L_1-L_2^*)^2+(a_1^*-a_2^*)^2+(b_1^*-b_2^*)^2\}^{0.5}$$

where L1*, $a_1$* and $b_1$*, and $L_2$*, $a_2$* and $b_2$* are the lightness L* and chromaticity indices a* and b* of the surface of the sintered body before and after a hydrothermal treatment at 140° C. for 24 hours.

The strength of the sintered body according to this embodiment is not limited and may be a strength required by an intended use, such as a package member. For example, the three-point flexural strength of the sintered body according to this embodiment is 800 MPa or more or 1,000 MPa or more. The strength of the sintered body according to this embodiment is preferably maximized and is, for example, 2,000 MPa or less or 1,800 MPa or less. The above upper and lower limits for the three-point flexural strength may be used in any combination.

In this embodiment, the three-point flexural strength can be measured using a method conforming to JIS R 1601.

A method for producing the sintered body according to this embodiment is described below.

The method for producing the sintered body according to this embodiment is not limited, and any method with which a sintered body having the above-described structure can be produced may be used. A preferable production method is, for example, a method for producing a sintered body, the method including forming a powder composition into a green body, the powder composition including a source of a stabilizer element-containing zirconia, 0.2% by mass or more and 5% by mass or less of a source of a lanthanoid element having an ionic radius larger than an atomic radius of zirconium, 0.5% by mass or more and 25% by mass or less of a source of aluminum and 0.03% by mass or more and 8% by mass or less of a source of a coloring element; and sintering the green body obtained in the above step at 1,380° C. or more and 1,580° C. or less.

The powder composition subjected to the forming step is a powder composition including a source of a stabilizer element-containing zirconia, 0.2% by mass or more and 5% by mass or less of a source of a lanthanoid element (hereinafter, referred to as "dissolved lanthanoid element source") having an ionic radius larger than the atomic radius of zirconium, 0.5% by mass or more and 25% by mass or less of a source of aluminum and 0.03% by mass or more and 8% by mass or less of a source of a coloring element.

The raw materials included in the powder composition, such as the dissolved lanthanoid element source, may be any raw materials of the same type or chemical composition as the intended sintered body. The raw materials may be included in the powder composition in a powder form.

The dissolved lanthanoid element source may be one or more selected from the group consisting of an oxide, a hydroxide, an oxyhydroxide, a halide, a sulfate salt, an acetate salt and a nitrate salt that include a dissolved lanthanoid element, is preferably one or more selected from the group consisting of an oxide, a hydroxide, an oxyhydroxide and a chloride that include a dissolved lanthanoid element, is more preferably one or more selected from the group consisting of an oxide, a hydroxide and a chloride that include a dissolved lanthanoid element, and is further preferably an oxide that includes a dissolved lanthanoid element.

Examples of the dissolved lanthanoid element included in the dissolved lanthanoid element source include one or more selected from the group consisting of praseodymium, neodymium, europium, terbium, holmium and erbium. Specific examples of the dissolved lanthanoid element include one or more selected from the group consisting of praseodymium, neodymium and terbium. Further specific examples thereof include terbium.

The aluminum source may be alumina ($Al_2O_3$) or an aluminum compound that serves as a precursor of alumina. The aluminum source may be, for example, at least one selected from the group consisting of alumina, aluminum hydroxide, aluminum nitrate and aluminum chloride, is preferably alumina, and is more preferably α-alumina.

The BET specific surface area of the aluminum oxide powder is preferably 5 $m^2/g$ or more and 20 $m^2/g$ or less.

The coloring element source may be one or more selected from the group consisting of an oxide, a hydroxide, an oxyhydroxide, a halide, a sulfate salt, an acetate salt and a nitrate salt that include a coloring element, is preferably one or more selected from the group consisting of an oxide, a hydroxide, an oxyhydroxide and a chloride that include a coloring element, is more preferably one or more selected from the group consisting of an oxide, a hydroxide and a chloride that include a coloring element, and is further preferably an oxide that includes a coloring element.

The coloring element included in the coloring element source may be any coloring element capable of forming a spinel compound together with aluminum, is preferably an element having an ionic radius smaller than the atomic radius of zirconium, is more preferably an element having an ionic radius smaller than the atomic radius of zirconium and larger than the ionic radius of an aluminum atom, is further preferably a transition metal element other than hafnium or zirconium, is further more preferably a 3d transition metal element, is particularly preferably one or more selected from the group consisting of manganese, iron, nickel and cobalt, and is particularly more preferably nickel.

The stabilizer element-containing zirconia source is preferably zirconia including 2 mol % or more and less than mol % yttrium.

The BET specific surface area of the stabilizer element-containing zirconia powder is preferably 5 $m^2/g$ or more and 20 $m^2/g$ or less. The proportion of tetragonal zirconia in the crystal phase of zirconia included in the stabilizer element-containing zirconia powder is preferably 50% or more.

The stabilizer element-containing zirconia source may be any mixed powder that includes stabilizer element-containing zirconia and at least one of a stabilizer element source and a zirconia source in addition to or instead of stabilizer element-containing zirconia.

Examples of the stabilizer element source include yttria.

The powder composition preferably includes the above-described raw materials in a homogeneous state.

The green body, which is to be subjected to the sintering step, may have any shape determined in consideration of the intended shape of the sintered body and thermal contraction due to sintering. The shape of the green body is, for example, one or more selected from the group consisting of a disk-like shape, a pillar shape, a tabular shape, a spherical shape and a substantially spherical shape.

The molding method used in the molding step may be any method with which the powder composition can be molded into an intended shape. The molding method is, for example, one or more selected from the group consisting of uniaxial pressing, cold isostatic pressing, slip casting and injection molding. Specifically, the molding method is, for example, at least one of uniaxial pressing and cold isostatic pressing.

In the sintering step, the green body is sintered at 1,380° C. or more and 1,580° C. or less. The dissolved lanthanoid element dissolves in the stabilizer element-containing zirconia in a stable manner. Furthermore, the aluminum oxide powder particles serve as nuclei, which react with an oxide of the coloring element which has a smaller ionic radius than a zirconium atom to produce a colored spinel compound.

The sintering temperature is preferably 1,400° C. or more and 1,550° C. or less.

The sintering method is not limited and may be any sintering method with which the colored spinel compound can be produced in a stable manner. The sintering method is, for example, one or more selected from the group consisting of pressureless sintering, hot pressing and hot isostatic pressing (hereinafter, also referred to as "HIP"). The sintering method is preferably pressureless sintering and is further preferably pressureless sintering performed in an air atmosphere. Note that pressureless sintering is a sintering method in which the green body is simply heated during sintering without application of external forces to the green body.

The sintering time may be set in accordance with the sintering method and sintering temperature used and is, for example, 1 hour or more and 5 hours or less and is specifically 2 hours or more and 4 hours or less.

In the sintering step, a sintered body that has been subjected to pressureless sintering may be subjected to HIP. HIP may be performed subsequent to pressureless sintering, for example, in an argon or nitrogen atmosphere at 50 MPa or more and 200 MPa or less and 1,400° C. or more and 1,550° C. or less for 30 minutes or more and 4 hours or less.

The production method according to this embodiment may include at least one of a polishing step in which the sintered body is polished and a working step in which the sintered body is worked into an intended shape. In the polishing step, the surface of the sintered body is polished subsequent to sintering. Polishing the sintered body gives, for example, a gloss to the surface of the sintered body and enables the production of a sintered body having a surface state appropriate to the intended use. In the working step, the sintered body is worked into an intended shape. Consequently, the sintered body may have a shape appropriate to the intended use. Either of the polishing and working steps may be performed earlier.

EXAMPLES

The above embodiment is described specifically with reference to Examples below. It should be noted that the above embodiment is not limited by Examples below.

Measurement of Color Tone

The color tone of a sintered body sample was measured using a method conforming to JIS Z 8722. In the measurement, a common spectrophotometer (e.g., "CM-700d" produced by Konica Minolta, Inc.) was used. The measurement conditions were as follows.

Light source: D65 light source
View angle: 10°
Measurement mode: SCI
Background: Black The sintered body sample used had a disk-like shape with a diameter of 20 mm and a thickness of 2.7 mm. Both surfaces of the sintered body sample were ground to a thickness of 1.0 mm, and one of the surfaces was subsequently mirror-polished. The polished surface was evaluated in terms of color tone, as an evaluation surface. The area effective for the color tone evaluation was set to a diameter of 10 mm.

Flexural Strength

Flexural strength was measured by conducting a three-point bend test on the basis of JIS R 1601 "Testing method for flexural strength of fine ceramics". The measurement was conducted 10 times, and the average thereof was considered as a three-point flexural strength. The measurement was conducted using a pillar sintered body sample having a width of 4 mm and a thickness of 3 mm with the distance between supports being 30 mm.

Density of Sintered Body

The measured density of a sintered body was obtained using a method conforming to JIS R 1634 (Test methods for density and apparent porosity of fine ceramics) and considered as the density of the sintered body.

Average Crystal Grain Size

The average size of zirconia crystal grains included in a sintered body sample was measured using an intercept method. Specifically, the mirror-polished sintered body sample was subjected to thermal etching, and the surface of the sintered body sample was subsequently observed with a scanning microscope at a 20,000-fold magnification. The average size of zirconia crystal grains was measured using the resulting SEM observation image by an intercept method (k=1.78). The number of the zirconia crystal grains measured was set to 200 or more.

Hydrothermal Treatment

A sintered body was subjected to a hydrothermal treatment in conformity with ISO 13356, except that the hydrothermal treatment was performed at 140° C. for 24 hr. The monoclinic phase ratio was determined by subjecting the sintered body that had been subjected to the hydrothermal treatment to an XRD measurement and subsequently using the following formula.

$$\text{Monoclinic phase ratio }(\%)=[I_m(111)+I_m(11\text{-}1)]\times 100/[I_m(111)+I_m(11\text{-}1)+I_t(111)+I(111)_c]$$

where I's represent the integrated intensities of the XRD peaks corresponding to the respective crystal planes and the subscripts m, t and c represent monoclinic, tetragonal and cubic phases, respectively.

In the XRD measurement, a common X-ray diffraction apparatus (the trade name "Ultima IIV", produced by Rigaku Corporation) was used, and an XRD pattern of the sintered body that had been subjected to the hydrothermal treatment was obtained. The XRD measurement was conducted under the following conditions.

Radiation source: CuKα radiation (λ=0.15418 nm)
Measurement mode: continuous scanning
Scanning speed: 4°/min
Step width: 0.02°
Measurement range: 2θ=26° to 33°

In the above measurement of XRD patterns, the XRD peaks corresponding to the crystal planes of zirconia were measured as peaks having peak tops at the following 2θ values.

XRD peak corresponding to the (111)-plane of monoclinic zirconia: 2θ=31°±0.5°

XRD peak corresponding to the (11-1)-plane of monoclinic zirconia: 2θ=28°±0.5°

The XRD peaks corresponding to the (111)-planes of tetragonal zirconia and cubic zirconia were measured at the same position, and the 2θ values of the peak tops were 2θ=30°±0.5°.

The integrated intensities of the XRD peaks corresponding to the above crystal planes were measured using SmartLab Studio II (Rigaku Corporation).

The color tone of the sintered body which had been subjected to the hydrothermal treatment was measured using the same method as described above. On the basis of the color tones of the sintered body which were measured before and after the hydrothermal treatment, the difference ΔE between the color tones before and after the hydrothermal treatment was determined using the following formula.

$$\text{Color tone difference } \Delta E=\{(L_1-L_2^*)^2+(a_1^*-a_2^*)^2+(b_1^*-b_2^*)^2\}^{0.5}$$

where $L_1^*$, $a_1^*$ and $b_1^*$ are the lightness L* and chromaticity indices a* and b* of the surface of the sintered body which were measured before the hydrothermal treatment was performed at 140° C. for 24 hours, while $L_2^*$, $a_2^*$ and $b_2^*$ are the lightness L* and chromaticity indices a* and b* of the surface of the sintered body which were measured after the hydrothermal treatment had been performed at 140° C. for 24 hours.

Example 1

A 3-mol % yttrium-containing zirconia powder (BET specific surface area: 6.8 $m^2/g$, produced by Tosoh Corporation), a high-purity alumina powder (BET specific surface area: 7.0 $m^2/g$, produced by Sumitomo Chemical Co., Ltd.), a nickel oxide (NiO) powder (produced by Wako Pure Chemical Industries, Ltd.), and terbium oxide (produced by Kojundo Chemical Lab. Co., Ltd.) were mixed with one another to form a mixed powder having the following chemical composition. Mixing was performed by wet blending using a ball mill. After mixing, drying was performed at 115° C.±15° C. in air to obtain a mixed powder.

$Al_2O_3$: 5.0% by mass
NiO: 3.0% by mass
$Tb_2O_5$: 0.2% by mass
3 mol % $Y_2O_3$-containing $ZrO_2$: the balance The mixed powder was compression-molded at a uniaxial molding pressure of 1,000 $kg/cm^2$ to form a green body. The green body was sintered to form a sintered body of Example 1. The sintering was performed using an electric furnace in air at a heating rate of 100° C./hr and a sintering temperature of 1,450° C. for a sintering time of 2 hours. Thus, terbium oxide was dissolved in yttrium stabilized zirconia, and nickel aluminum composite oxide having a spinel structure was formed.

The sintered body that included the zirconia including terbium and yttrium dissolved therein (colored zirconia phase) as a matrix and nickel aluminum composite oxide (colored spinel compound) was used as a sintered body of Example 1. The sintered body of Example 1 included crystal grains of alumina ($Al_2O_3$) in addition to the colored spinel compound. The contents of aluminum and nickel in the sintered body were 5.0% by mass and 3.0% by mass, respectively. The contents of terbium and yttria in the zirconia were 0.14 mol % and 3.0 mol %, respectively.

The polished surface of the sintered body appeared vivid green when observed visually. The three-point flexural strength of the sintered body was 1,117 MPa.

Example 2

A sintered body that included the zirconia including terbium and yttrium dissolved therein (colored zirconia phase) as a matrix and nickel aluminum composite oxide (colored spinel compound) was prepared as in Example 1, except that a mixed powder having the following chemical composition was prepared and the sintering temperature was set to 1,450° C. This sintered body was used as a sintered body of Example 2.

$Al_2O_3$: 5.0% by mass
NiO: 0.2% by mass
$Tb_2O_5$: 2.0% by mass
3 mol % $Y_2O_3$-containing $ZrO_2$: the balance The sintered body of Example 2 included crystal grains of alumina in addition to the colored spinel compound. The contents of aluminum and nickel in the sintered body were 5.0% by mass and 0.2% by mass, respectively. The contents of terbium and yttria in the zirconia were 1.4 mol % and 3.0 mol %, respectively.

The polished surface of the sintered body appeared vivid green when observed visually. The three-point flexural strength of the sintered body was 1,229 MPa.

Example 3

A sintered body that included the zirconia including terbium and yttrium dissolved therein (colored zirconia phase) as a matrix and nickel aluminum composite oxide (colored spinel compound) was prepared as in Example 1, except that a mixed powder having the following chemical composition was prepared and the sintering temperature was set to 1,450° C. This sintered body was used as a sintered body of Example 3.

$Al_2O_3$: 5.0% by mass
NiO: 3.0% by mass
$Tb_2O_5$: 2.0% by mass
3 mol % $Y_2O_3$-containing $ZrO_2$: the balance The sintered body of Example 3 included crystal grains of alumina in addition to the colored spinel compound. The contents of aluminum and nickel in the sintered body were 5.0% by mass and 3.0% by mass, respectively. The contents of terbium and yttrium in the zirconia were 1.4 mol % and 3.0 mol %, respectively.

The polished surface of the sintered body appeared vivid green when observed visually. The three-point flexural strength of the sintered body was 1,003 MPa.

Example 4

A sintered body that included the zirconia including terbium and yttrium dissolved therein (colored zirconia phase) as a matrix and nickel aluminum composite oxide (colored spinel compound) was prepared as in Example 1, except that a mixed powder having the following chemical composition was prepared and the sintering temperature was set to 1,450° C. This sintered body was used as a sintered body of Example 4.

$Al_2O_3$: 0.5% by mass
NiO: 1.0% by mass
$Tb_2O_5$: 1.0% by mass
3 mol % $Y_2O_3$-containing $ZrO_2$: the balance The sintered body of Example 4 included crystal grains of alumina in addition to the colored spinel compound. The contents of aluminum and nickel in the sintered body were 0.5% by mass and 1.0% by mass, respectively. The contents of terbium and yttria in the zirconia were 0.7 mol % and 3.0 mol %, respectively.

It was confirmed that the polished surface of the sintered body appeared vivid green when observed visually.

Example 5

A sintered body that included the zirconia including terbium and yttrium dissolved therein (colored zirconia phase) as a matrix and nickel aluminum composite oxide (colored spinel compound) was prepared as in Example 1, except that a mixed powder having the following chemical composition was prepared and the sintering temperature was set to 1,450° C. This sintered body was used as a sintered body of Example 5.

$Al_2O_3$: 2.0% by mass
NiO: 0.5% by mass
$Tb_2O_5$: 1.5% by mass
3 mol % $Y_2O_3$-containing $ZrO_2$: the balance The sintered body of Example 5 included crystal grains of alumina in addition to the colored spinel compound. The contents of aluminum and nickel in the sintered body were 2.0% by mass and 0.5% by mass, respectively. The contents of terbium and yttria in the zirconia were 1.0 mol % and 3.0 mol %, respectively.

It was confirmed that the polished surface of the sintered body appeared vivid green when observed visually.

Example 6

A sintered body that included the zirconia including terbium and yttrium dissolved therein (colored zirconia phase) as a matrix and nickel aluminum composite oxide (colored spinel compound) was prepared as in Example 1, except that a mixed powder having the following chemical composition was prepared and the sintering temperature was set to 1,450° C. This sintered body was used as a sintered body of Example 6.

$Al_2O_3$: 0.5% by mass
NiO: 1.0% by mass
$Tb_2O_5$: 2.0% by mass
3 mol % $Y_2O_3$-containing $ZrO_2$: the balance The sintered body of Example 6 included crystal grains of alumina in addition to the colored spinel compound. The contents of aluminum and nickel in the sintered body were by mass and 1.0% by mass, respectively. The contents of terbium and yttria in the zirconia were 1.4 mol % and 3.0 mol %, respectively.

It was confirmed that the polished surface of the sintered body appeared vivid green when observed visually.

Example 7

A sintered body that included the zirconia including terbium and yttrium dissolved therein (colored zirconia phase) as a matrix and nickel aluminum composite oxide (colored spinel compound) was prepared as in Example 1, except that a mixed powder having the following chemical composition was prepared and the sintering temperature was set to 1,500° C. This sintered body was used as a sintered body of Example 7.

$Al_2O_3$: 20% by mass
NiO: 3.0% by mass
$Tb_2O_5$: 2.5% by mass
3 mol % $Y_2O_3$-containing $ZrO_2$: the balance The sintered body of Example 7 included crystal grains of alumina in addition to the colored spinel compound. The contents of aluminum and nickel in the sintered body were 20% by mass and 3.0% by mass, respectively. The contents of terbium and yttria in the zirconia were 1.7 mol % and 3.0 mol %, respectively.

It was confirmed that the polished surface of the sintered body appeared vivid green when observed visually.

Example 8

A sintered body that included the zirconia including terbium and yttrium dissolved therein (colored zirconia phase) as a matrix and nickel aluminum composite oxide (colored spinel compound) was prepared as in Example 1, except that a mixed powder having the following chemical composition was prepared and the sintering temperature was set to 1,500° C. This sintered body was used as a sintered body of Example 8.

$Al_2O_3$: 20% by mass
NiO: 2.0% by mass
$Tb_2O_5$: 2.0% by mass
3 mol % $Y_2O_3$-containing $ZrO_2$: the balance The sintered body of Example 8 included crystal grains of alumina in addition to the colored spinel compound. The contents of aluminum and nickel in the sintered body were 20% by mass and 2.0% by mass, respectively. The contents of terbium and yttria in the zirconia were 1.4 mol % and 3.0 mol %, respectively.

It was confirmed that the polished surface of the sintered body appeared vivid green when observed visually.

Comparative Example 1

A 3-mol % yttrium-containing zirconia powder (BET specific surface area: 6.8 $m^2/g$, produced by Tosoh Corporation) and a nickel oxide (NiO) powder (produced by Wako Pure Chemical Industries, Ltd.) were mixed with each other to form a mixed powder having the following chemical composition. Mixing was performed by wet blending using a ball mill. After mixing, drying was performed at 115° C.±15° C. in air to obtain a mixed powder.

NiO: 3.0% by mass 3mol % $Y_2O_3$-containing $ZrO_2$: the balance

The mixed powder was compression-molded at a uniaxial molding pressure of 1,000 $kg/cm^2$ to form a green body. The green body was sintered to form a sintered body of Comparative Example 1. The sintering was performed using an electric furnace in air at a heating rate of 100° C./hr and a sintering temperature of 1,500° C. for a sintering time of 2 hours. Thus, a zirconia sintered body including nickel and yttrium dissolved therein was prepared and used as a sintered body of Comparative Example 1.

The contents of nickel and yttria in the sintered body of Comparative Example 1 were 5.0% by mass and 3.0 mol %, respectively.

It was confirmed that, although the polished surface of the sintered body appeared green when observed visually, the monoclinic phase ratio of the sample that had been subjected to the hydrothermal treatment was 69%, that is, the surface quality was poor. The color tone was changed compared with that measured before degradation.

Tables 1 and 2 list the evaluation results of Examples and Comparative Example.

TABLE 1

| | Sintering temperature (° C.) | Sintered body density ($g/cm^3$) | Monoclinic phase ratio after hydrothermal treatment (%) |
|---|---|---|---|
| Example 1 | 1450 | 5.90 | 12 |
| Example 2 | 1450 | 5.95 | 6 |
| Example 3 | 1450 | 5.91 | 10 |
| Example 4 | 1450 | 6.05 | 17 |
| Example 5 | 1450 | 6.01 | 14 |
| Example 6 | 1450 | 6.06 | 21 |
| Example 7 | 1500 | 5.52 | 9 |
| Example 8 | 1500 | 5.51 | 22 |
| Comparative Example 1 | 1500 | 6.12 | 69 |

The results listed in Table 1 confirm that the monoclinic phase ratios of the sintered bodies prepared in Examples which were measured after the hydrothermal treatment were 25% or less.

TABLE 2

| | Color tone before hydrothermal treatment | | | Color tone after hydrothermal treatment | | | Color tone difference |
|---|---|---|---|---|---|---|---|
| | $L_1$* | $a_1$* | $b_1$* | $L_2$* | $a_2$* | $b_2$* | ΔE |
| Example 1 | 63.5 | −18.5 | −12.7 | 62.9 | −19.0 | −12.4 | 0.8 |
| Example 2 | 73.3 | −6.4 | 22.4 | 73.1 | −6.5 | 22.5 | 0.2 |
| Example 3 | 61.1 | −18.4 | −0.1 | 60.7 | −18.8 | 0.1 | 0.6 |
| Example 4 | 54.3 | −8.3 | 8.1 | 54.0 | −8.4 | 8.4 | 0.5 |
| Example 5 | 63.9 | −12.9 | 12.3 | 63.7 | −13.2 | 12.5 | 0.4 |
| Example 6 | 53.8 | −6.4 | 8.4 | 53.5 | −6.6 | 8.6 | 0.5 |
| Example 7 | 73.8 | −15.2 | 10.7 | 73.6 | −15.5 | 10.6 | 0.3 |
| Example 8 | 61.3 | −17.6 | 3.2 | 61.1 | −17.9 | 3.2 | 0.4 |
| Comparative Example 1 | 52.2 | −8.9 | 7.5 | 52.9 | −9.0 | 5.4 | 2.2 |

The results listed in Table 2 confirm that the differences ΔE between the color tones of the sintered bodies prepared in Examples before and after the hydrothermal treatment were 1.0 or less. Changes in the color tones of the sintered bodies were not confirmed visually. This confirms that the sintered bodies prepared in Examples may appear vivid green without impairing esthetics even in a severe environment.

The zirconia sintered body according to this embodiment is a sintered body that has a high density and high durability and that has stable chromaticity even when it becomes degraded after use, that is, is excellent in terms of esthetics. The zirconia sintered body according to this embodiment may be used as a material for scratch-proof exclusive-looking jewelry or various decorative members, such as parts of clocks and watches and exterior parts of portable electronic devices.

The entire contents of the specification, claims, and abstract of Japanese Patent Application No. 2022-91154 filed on Jun. 3, 2022, are cited and incorporated herein as the disclosure of the specification of the present disclosure.

What is claimed is:

1. A sintered body comprising zirconia, the zirconia including:

a stabilizer element dissolved therein; and a lanthanoid element dissolved therein, the lanthanoid element being terbium, wherein a content of monoclinic zirconia after a hydrothermal treatment at 140° C. for 24 hours is less than 25%, and the sintered body includes a spinel compound, the spinel compound including aluminum and a coloring element, wherein a proportion of tetragonal phase in a crystal structure of the sintered body is 75% or more.

2. The sintered body according to claim 1, wherein the stabilizer element is one or more selected from the group consisting of yttrium, cerium, magnesium and calcium, and wherein the coloring element is nickel.

3. The sintered body according to claim 2, wherein the stabilizer element is yttrium.

4. The sintered body according to claim 1, wherein a content of the stabilizer element in the zirconia is 2 mol % or more.

5. The sintered body according to claim 1, wherein a content of the lanthanoid element is 0.1 mol % or more.

6. The sintered body according to claim 1, wherein the coloring element is one or more selected from the group consisting of manganese, nickel, cobalt and iron.

7. The sintered body according to claim 1, wherein the coloring element is nickel.

8. The sintered body according to claim 1, the sintered body including aluminum oxide.

9. The sintered body according to claim 8, wherein a content of the aluminum oxide is 0.5% by mass or more and 25% by mass or less.

10. The sintered body according to claim 1, the sintered body having a structure including crystal grains of the zirconia as a matrix and crystal grains of the spinel compound.

11. A sintered body comprising zirconia, the zirconia including:

a stabilizer element dissolved therein; and a lanthanoid element dissolved therein, the lanthanoid element being terbium, wherein a content of monoclinic zirconia after a hydrothermal treatment at 140° C. for 24 hours is less than 25%, and the sintered body includes a spinel compound, the spinel compound including aluminum and a coloring element, and wherein an average size of crystal grains of the zirconia is 2 μm or less.

12. The sintered body according to claim 1, wherein a measured density of the sintered body is 5.45 $g/cm^3$ or more.

13. The sintered body according to claim 1, wherein a lightness L" and chromaticity indices a and b* of the sintered body in a L*a*b* color system satisfy the following conditions:

lightness L*: 50≤L*≤90 chromaticity index a*: −20≤a*≤2 chromaticity index b*: −20≤b*≤30.

14. The sintered body according to claim 1, wherein a difference ΔE between color tones of the sintered body before and after a hydrothermal treatment at 140° C. for 24 hours is 0 or more and 2.0 or less.

15. A member comprising the sintered body according to claim 1.

16. A method for producing the sintered body according to claim 1, the method comprising:

forming a powder composition into a green body, the powder composition including a source of a stabilizer element-containing zirconia, 0.2% by mass or more and 5% by mass or less of a source of a lanthanoid element having an ionic radius larger than an atomic radius of zirconium, 0.5% by mass or more and 25% by mass or less of a source of aluminum and 0.03% by mass or more and 8% by mass or less of a source of a coloring element; and sintering the green body at 1,380° C. or more and 1,580° C. or less.

* * * * *